US012691515B2

(12) United States Patent
Sakaguchi

(10) Patent No.: US 12,691,515 B2
(45) Date of Patent: Jul. 28, 2026

(54) ELECTRIC DISCHARGE MACHINING APPARATUS AND METHOD FOR FIXING POWER CONDUCTOR IN ELECTRIC DISCHARGE MACHINING APPARATUS

(71) Applicant: Sodick Co., Ltd., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 816 days.

(21) Appl. No.: 18/074,534

(22) Filed: Dec. 5, 2022

(65) Prior Publication Data

US 2023/0191514 A1 Jun. 22, 2023

(30) Foreign Application Priority Data

Dec. 16, 2021 (JP) ................................. 2021-203944

(51) Int. Cl.
B23H 1/02 (2006.01)
B23H 7/10 (2006.01)
B23H 7/26 (2006.01)

(52) U.S. Cl.
CPC ............. B23H 1/024 (2013.01); B23H 7/105 (2013.01); B23H 7/26 (2013.01); B23H 2400/00 (2013.01)

(58) Field of Classification Search
CPC .......... B23H 1/024; B23H 7/10; B23H 7/105; B23H 7/26; B23H 2400/00
See application file for complete search history.

(56) References Cited

U.S. PATENT DOCUMENTS

2015/0367437 A1* 12/2015 Irie ........................ B23H 7/102
219/69.11
2016/0023291 A1* 1/2016 Inoue .................... B23H 7/102
219/69.12

FOREIGN PATENT DOCUMENTS

| CN | 105269099 | 1/2016 |
| JP | S63212419 | 9/1988 |
| JP | 2521251 | 10/1996 |
| JP | 2002096221 | 4/2002 |

* cited by examiner

*Primary Examiner* — Brian W Jennison
(74) *Attorney, Agent, or Firm* — JCIPRNET

(57) ABSTRACT

Provided is an electric discharge machining apparatus including: a wire guide, positioning and guiding a wire electrode stretched perpendicularly to a horizontal line; a power conductor, energizing the wire electrode; a guide assembly, accommodating the wire guide and the power conductor; an extrusion member, provided in the guide assembly and pushing out the power conductor in a direction of the wire electrode; a drive device, reciprocating the extrusion member in a horizontal uniaxial direction; a fixing device, fixing the power conductor in a predetermined position within the guide assembly by the extrusion member; and an elastic member, provided coaxially with the extrusion member of the fixing device and constantly pushing out the power conductor in the direction of the wire electrode in a state in which the power conductor is attachable to and detachable from the guide assembly.

6 Claims, 3 Drawing Sheets

ELECTRIC DISCHARGE MACHINING APPARATUS AND METHOD FOR FIXING POWER CONDUCTOR IN ELECTRIC DISCHARGE MACHINING APPARATUS

CROSS-REFERENCE TO RELATED APPLICATIONS

This application claims the priority benefit of Japan Application No. 2021-203944, filed on Dec. 16, 2021. The entirety of the above-mentioned patent application is hereby incorporated by reference herein and made a part of this specification.

BACKGROUND

Technical Field

The disclosure relates to an electric discharge machining apparatus that performs electric discharge machining on a workpiece into a desired shape using a wire electrode as a tool electrode, and a method for fixing a power conductor in an electric discharge machining apparatus.

Related Art

Wire electric discharge machining is an electric discharge machining method as follows. While a voltage pulse is applied to a predetermined machining gap formed between a wire electrode and a workpiece and an electric discharge is repeatedly generated, the wire electrode and the workpiece are relatively moved to machine the workpiece into a desired shape by electric discharge energy. Hence, in wire electric discharge machining, each of the wire electrode and the workpiece needs to be connected to a power supply for electric discharge machining to be supplied with power. A general electric discharge machining apparatus has the following configuration. Wire guides are arranged facing each other with a workpiece interposed therebetween, and a wire electrode is stretched with a predetermined tension between the pair of wire guides while being delivered and traveled along a predetermined supply path (travel path) to a machining gap. In this kind of electric discharge machining apparatus, each of the pair of wire guides is incorporated into a guide assembly, and a power conductor is also integrally accommodated within the guide assembly, so that current is supplied to the wire electrode through the power conductor.

The power conductor contacts the traveling wire electrode and is worn by frictional heat caused by contact resistance generated between the power conductor and the wire electrode. When machining is continued for a long time, a groove may be formed in a portion of the power conductor in contact with the wire electrode, a contact pressure between the power conductor and the wire electrode may be reduced, and sufficient current may not be able to be supplied to the wire electrode. Hence, the power conductor can be made horizontally slidable according to a degree of wear of the power conductor, the portion of the power conductor in contact with the wire electrode can be shifted, and a contact state between the power conductor and the wire electrode can be returned to an initial state. Alternatively, the power conductor can be made able to be extracted from or inserted into the guide assembly, and the power conductor is accommodated within the guide assembly so that it can be replaced with a new power conductor. For example, Patent Document 1 discloses a wire guide device for a wire-cut electric discharge machine, in which a plate-like power conductor is firmly pressed and fixed in a desired position within a guide assembly by a fixing tool such as a set screw or a bolt so that it does not move during machining. Meanwhile, when a wire electrode is inserted, a contact state between the wire electrode and the power conductor is canceled by an actuator.

[Patent Document 1] Japanese Utility Model No. 2521251

An electric discharge machining apparatus has a configuration such as that disclosed in, for example, Patent Document 1, in which the power conductor is firmly fixed to the guide assembly using the fixing tool such as a set screw or a bolt. In such an apparatus, when shifting a contact position in the power conductor with the wire electrode or replacing the power conductor with a new one, it is necessary for an operator to use a predetermined tool to loosen the fixing tool, release the firmly fixed power conductor from the guide assembly so that it can be moved, and slide the power conductor.

A member such as a machining tank wall, a machining head, or a workpiece stand is provided around the guide assembly. Such a member may hinder the operation of operating the fixing tool by the predetermined tool and sliding the power conductor, thus imposing a heavy burden on the operator. If the power conductor cannot be sufficiently tightened and fixed, there is a risk that the power conductor may wobble during machining, thus causing secondary discharge in the power conductor or between the power conductor the wire guide and damaging the power conductor or the wire guide. In contrast, if the power conductor is excessively tightened, there is a risk that the fixing tool may damage the power conductor.

SUMMARY

According to the disclosure, an electric discharge machining apparatus is provided including: a wire guide, positioning and guiding a wire electrode stretched perpendicularly to a horizontal line; a power conductor, energizing the wire electrode; a guide assembly, accommodating the wire guide and the power conductor; an extrusion member, provided in the guide assembly and pushing out the power conductor in a direction of the wire electrode; a drive device, reciprocating the extrusion member in a horizontal uniaxial direction; a fixing device, fixing the power conductor in a predetermined position within the guide assembly by the extrusion member; and an elastic member, provided coaxially with the extrusion member of the fixing device and constantly pushing out the power conductor in the direction of the wire electrode in a state in which the power conductor is attachable to and detachable from the guide assembly.

DESCRIPTION OF THE EMBODIMENTS

The disclosure provides an electric discharge machining apparatus in which a power conductor can be fixed relatively easily and stably with an appropriate fixing force without using a predetermined tool, and a worn power conductor can be replaced or slid.

According to the electric discharge machining apparatus and a method for fixing a power conductor of the disclosure, when fixing a power conductor, an extrusion member always presses the power conductor against a fixation surface of a guide assembly with a preset appropriate force. Hence, the power conductor can be appropriately fixed within the guide assembly without help, and there is no risk of damaging the power conductor when fixing it. While it is being fixed, the power conductor is fixed firmly without vibrating or wobbling. On the other hand, when temporarily fixing the power conductor, although the extrusion member does not fix the power conductor, the power conductor is held between an elastic member and the fixation surface of the guide assembly by a relatively small force to the extent that the power conductor can be moved by human power. Hence, the operator is able to slide the power conductor in a state in which the power conductor does not naturally move. Therefore, according to the disclosure, the burden on the operator when attaching or removing the power conductor or changing the position in the power conductor that contacts the wire electrode can be reduced, and the power conductor is stably mounted with an appropriate force without a risk of damaging the power conductor or the wire guide.

Figure 1:
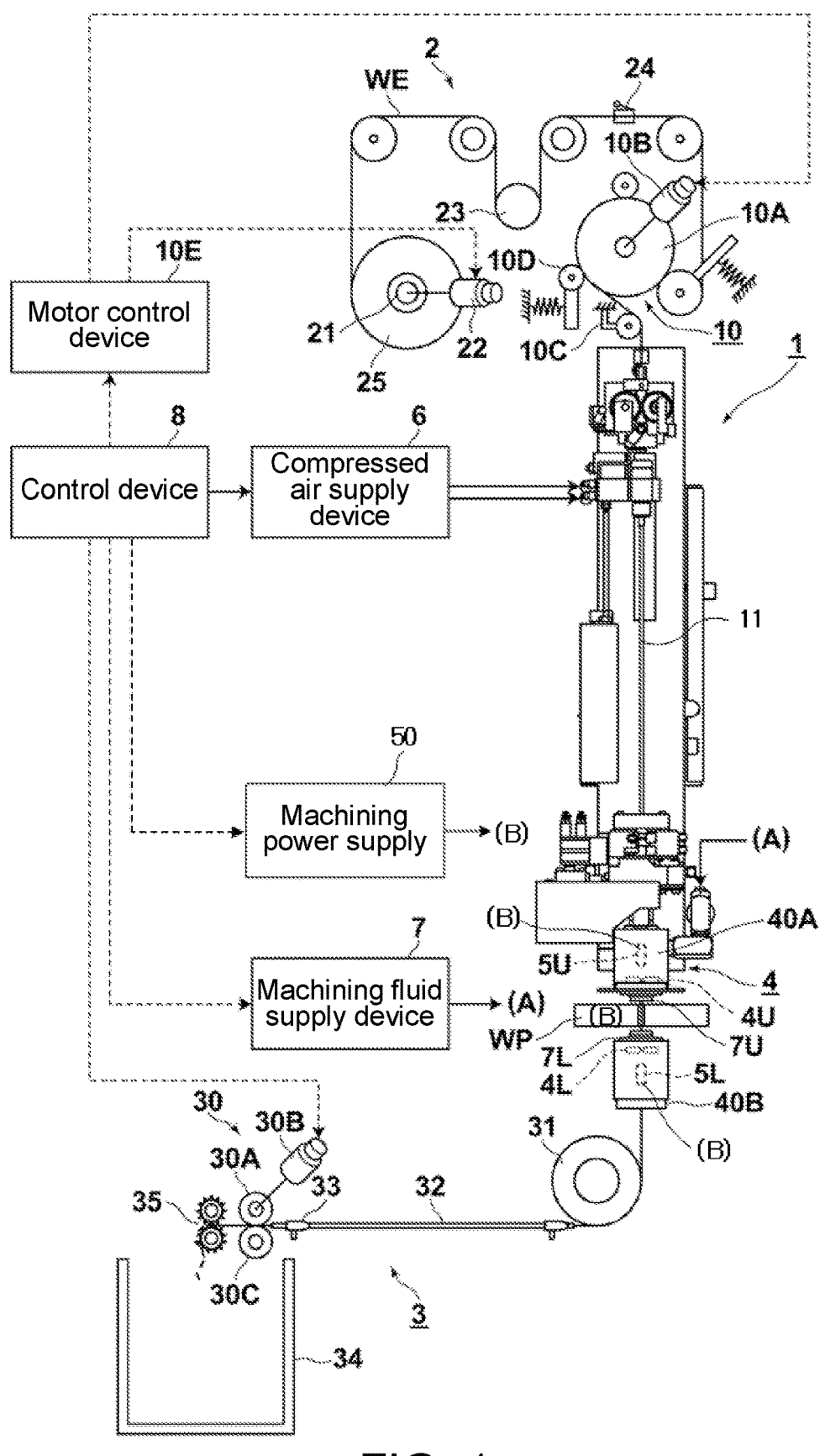
FIG. 1 is a schematic side view showing an electric discharge machining apparatus of the disclosure.

Embodiments of the disclosure will be described below with reference to the drawings. FIG. 1 shows an outline of an overall configuration of an electric discharge machining apparatus of the disclosure. In FIG. 1, the electric discharge machining apparatus is schematically shown so that a prescribed travel path of a wire electrode is known. In FIG. 1, an automatic wire threader, a wire feeding mechanism and a wire guide mechanism are illustrated in a state viewed from the front of the machine, and a wire collecting mechanism is illustrated in a state viewed from a side of the machine. A configuration of the electric discharge machining apparatus according to the present embodiment is described below with reference to FIG. 1.

In the electric discharge machining apparatus of the embodiment shown in FIG. 1, a wire electrode WE is stretched perpendicularly to a horizontal plane. The wire electrode WE and a workpiece WP are arranged facing each other so that a predetermined machining gap is formed between the wire electrode WE and the workpiece WP. The wire electrode WE and the workpiece WP are relatively moved in any direction on the horizontal plane by a moving device (not shown). A so-called taper device that tilts the wire electrode WE with respect to the workpiece WP is not shown.

The electric discharge machining apparatus is configured to include an automatic wire threader 1, a wire feeding mechanism 2, a wire collecting mechanism 3, a wire guide mechanism 4, a machining power supply 50, a compressed air supply device 6, a machining fluid supply device 7, and a control device 8. The wire electrode WE is stretched between a pair of wire guides 4U and 4L provided with the workpiece WP interposed therebetween while being applied with a predetermined tension along a prescribed travel path.

The automatic wire threader 1 is a tool for inserting a tip of the wire electrode WE through a prepared hole and automatically stretching the wire electrode WE between the pair of wire guides 4U and 4L.

A guide pipe 11 is provided substantially perpendicularly to the horizontal plane along the prescribed travel path of the wire electrode WE. The guide pipe 11 is a tool for guiding the wire electrode WE from above the automatic wire threader 1 to the upper wire guide 4U so that the wire electrode WE does not deviate from the prescribed travel path. The guide pipe 11 is vertically reciprocated by a lifting device. The guide pipe 11 moves to an upper limit position when subjecting the wire electrode WE to annealing and cutting. The guide pipe 11 moves to an entrance of the upper wire guide 4U, which is a lower limit position, when inserting the tip of the wire electrode WE through the prepared hole.

A wire vibration device (not shown) is provided directly above an inlet of the guide pipe 11. The wire vibration device is a tool for applying minute vertical vibrations to the wire electrode WE. In the wire vibration device, compressed air of a predetermined pressure sent from the compressed air supply device 6 is input from a pair of introduction ports in an alternate manner by switching of an electromagnetic valve, and the pressure of the compressed air is directly or indirectly applied to the wire electrode WE along the prescribed travel path. As a result, the wire electrode WE is able to move up and down minutely and is able to easily pass through the prepared hole.

The wire feeding mechanism 2 is a tool for continuously feeding new wire electrodes WE that have not been subjected to machining to the machining gap along the prescribed travel path. The wire feeding mechanism 2 includes a tension device 10. The wire feeding mechanism 2 mainly includes a reel 21, a brake device 22, a servo pulley 23, and a feed roller 10A rotated by a delivery motor 10B. In the wire feeding mechanism 2, a disconnection detector 24 such as a limit switch and a tension detector 10C such as a strain gauge are provided.

Each rotating body of the wire feeding mechanism 2 including the reel 21, the servo pulley 23 and the feed roller 10A is a guide that guides a traveling wire electrode WE along the prescribed travel path. In the following description, a direction in which each rotating body rotates when feeding the wire electrode WE is a forward rotation direction, and a direction opposite to the forward rotation direction is a reverse rotation direction.

A wire bobbin 25 storing the wire electrode WE is rotatably attached to the reel 21. Since the wire electrode WE is wound around and stored on the wire bobbin 25, the wire electrode WE has a curl. The brake device 22 applies a required torque in the reverse rotation direction of the reel 21 and applies a back tension to the wire electrode WE. The brake device 22 prevents the wire bobbin 25 loaded on the reel 21 from idling and prevents the wire electrode WE in the wire feeding mechanism 2 from slackening.

The brake device 22 is specifically a brake motor such as a hysteresis motor or an electromagnetic brake such as an electromagnetic clutch. In the case of being a brake motor, the brake device 22 can be operated synchronously with the delivery motor 10B. In the case of being an electromagnetic brake, the brake device 22 is controlled independently of the delivery motor 10B in view of the configuration in which brake force is obtained from frictional force of the electromagnetic clutch. However, since a timing of actuation of the electromagnetic brake and the brake force can be controlled by the control device 8, it is possible to operate the electromagnetic brake in accordance with an operation timing of each device of the automatic wire threader 1.

The servo pulley 23 is provided between the reel 21 and the feed roller 10A. The servo pulley 23 applies a constant downward load to the wire electrode WE between the reel 21 and the feed roller 10A by its own weight. The servo pulley 23 is provided so as to freely move up and down. Hence, the servo pulley 23 moves up and down in accordance with a minute variation in tension. As a result, the servo pulley 23 absorbs minute vibrations generated in the wire electrode WE drawn out from the wire bobbin 25 and stabilizes the tension.

The tension device 10 is a tool for applying the predetermined tension to the wire electrode WE. The tension device 10 is included in the wire feeding mechanism 2. The tension device 10 mainly includes the feed roller 10A, the delivery motor 10B, the tension detector 10C, a pinch roller 10D, and a motor control device 10E.

The feed roller 10A is rotated by the delivery motor 10B. The feed roller 10A obtains a driving force for moving the wire electrode by the pinch roller 10D pressing the wire electrode WE against an outer peripheral surface of the feed roller 10A. By a plurality of rollers including the pinch roller 10D, the feed roller 10A prevents the wire electrode WE from slackening and allows the wire electrode WE to travel smoothly without breaking.

The delivery motor 10B is a servo motor. The delivery motor 10B is controlled through the motor control device 10E in accordance with a command signal of the control device 8. The delivery motor 10B performs a servo operation based on a detection signal of the tension detector 10C according to the motor control device 10E. Hence, even if a set tension value is small, the tension of the wire electrode WE is stable, and the risk of the wire electrode WE slackening or breaking is reduced. The control device 8 is able to control the delivery motor 10B in accordance with a torque in a winding device 30 of the wire collecting mechanism 3.

When the wire electrode WE is stretched between the pair of wire guides 4U and 4L, the feed roller 10A applies the predetermined tension to the wire electrode WE by a rotation speed difference between the feed roller 10A and a winding roller 30A of the winding device 30 while the wire electrode WE is substantially stopped or while the wire electrode WE is continuously delivered to the machining gap at a predetermined travel speed.

When subjecting the wire electrode WE to wire threading, the feed roller 10A is rotated in the forward rotation direction at a constant speed by the delivery motor 10B, thus causing the tip of the wire electrode WE to be inserted through the prepared hole and passing the wire electrode WE through to be caught by the wire collecting mechanism 3. When performing a retry of automatic wire threading, the feed roller 10A is rotated in the reverse rotation direction at a constant speed by the delivery motor 10B, thus winding up the wire electrode WE to a predetermined position.

The wire collecting mechanism 3 is a tool for collecting the wire electrode WE that has been subjected to machining and has worn out from the machining gap along the prescribed travel path. The wire collecting mechanism 3 includes the winding device 30, a roller (pulley) 31 for changing direction, a conveyance pipe 32, an aspirator 33, a bucket 34 and a wire cutting device 35. The winding device 30 mainly includes the winding roller 30A, a winding motor 30B and a pinch roller 30C. The winding roller 30A constitutes a driving roller of the winding device 30, and the pinch roller 30B constitutes a driven roller of the winding device 30.

The wire electrode WE that has passed through the prepared hole and has passed through the lower wire guide 4L is changed in its direction of travel into a horizontal direction by the roller 31 and is inserted into the conveyance pipe 32. The wire electrode WE in the conveyance pipe 32 is sucked by the aspirator 33 and obtains a propulsive force.

The wire electrode WE that has moved out of the conveyance pipe 32 is caught and sandwiched between the winding roller 30A and the pinch roller 30C of the winding device 30. The winding roller 30A is rotated in the forward rotation direction at a predetermined rotation speed by the winding motor 30B being a constant speed rotation motor, and draws the wire electrode WE that has been used to directly above the bucket 34 while causing the wire electrode WE to travel at the predetermined travel speed. In the electric discharge machining apparatus of the present embodiment, the wire electrode WE drawn to above the bucket 34 is shredded by the wire cutting device 35 and accommodated in the bucket 34.

The wire guide mechanism 4 is composed of the pair of upper and lower wire guides 4U and 4L provided with the workpiece WP interposed therebetween. A wire guide is incorporated into the guide assembly 40. The upper wire guide 4U is incorporated into an upper guide assembly 40A, and the lower wire guide 4L is incorporated into a lower guide assembly 40B. The pair of wire guides 4U and 4L positions the wire electrode WE on the prescribed travel path and guides the traveling wire electrode WE. Both of the pair of wire guides 4U and 4L are "die guides" having a die shape. Since there is a clearance of several μm between each of the wire guides 4U and 4L and the wire electrode WE, the tip of the wire electrode WE is able to pass through the wire guides 4U and 4L during automatic wire threading.

The guide assembly 40 accommodates a power conductor 5 for supplying a machining current from the machining power supply 50 to the wire electrode WE. An upper power conductor 5U is accommodated in the upper guide assembly 40A, and a lower power conductor 5L is accommodated in the lower guide assembly 40B. An upper machining fluid jet nozzle 7U and a lower machining fluid jet nozzle 7L for jetting and supplying a jet of machining fluid of a predetermined pressure supplied from the machining fluid supply device 7 to the machining gap are respectively incorporated into the upper guide assembly 40A and the lower guide assembly 40B.

The machining power supply 50 includes at least a DC power supply, a switching circuit and a relay switch (all not shown). In the electric discharge machining apparatus of the present embodiment, the machining power supply 50 includes a machining power supply circuit that supplies the machining current to the machining gap.

The DC power supply of the machining power supply 50 has its positive electrode connected to the upper power conductor 5U and the lower power conductor 5L respectively accommodated in the upper guide assembly 40A and the lower guide assembly 40B, and has its negative electrode connected to the workpiece WP. During machining, the machining power supply 50 repeatedly applies a voltage pulse to the machining gap through the upper power conductor 5U, the lower power conductor 5L and the workpiece WP and intermittently supplies the predetermined machining current to the machining gap.

The compressed air supply device 6 is a tool for supplying compressed air for actuation to the wire vibration device of the automatic wire threader 1. The compressed air supply device 6 includes a compressed air supply source such as an air compressor, a plurality of electromagnetic valves, and a regulator (all not shown). By adjusting high-pressure compressed air of the compressed air supply source to a predetermined pressure by the regulator and regularly switching the electromagnetic valves, the compressed air supply device 6 supplies the compressed air of the predetermined pressure to the pair of introduction ports of the wire vibration device in an alternate manner.

The machining fluid supply device 7 is a tool for supplying a jet of machining fluid of a predetermined pressure to the machining gap. By a jet pump (not shown), the machining fluid supply device 7 supplies clean machining fluid stored in a reservoir tank to the upper machining fluid jet nozzle 7U and the lower machining fluid jet nozzle 7L respectively provided in the upper guide assembly 40A and the lower guide assembly 40B. Accordingly, a jet of machining fluid of the predetermined pressure is injected from each of the machining fluid jet nozzles 7U and 7L toward the machining gap coaxially with respect to an axis direction of the prescribed travel path of the wire electrode WE. In FIG. 1, illustration of a machining fluid path from the machining fluid supply device 7 to the wire guide mechanism 4 is omitted halfway, and a portion (indicated by (A)) of the path exiting from the machining fluid supply device 7 is connected to a portion (indicated by (A)) of the path entering the wire guide mechanism 4.

The control device 8 is a tool for controlling an operation of the electric discharge machining apparatus. Main controls among control operations of the control device 8 are described below. In the electric discharge machining apparatus of the present embodiment, the control device 8 controls an operation of the automatic wire threader 1. The control device 8 controls the machining power supply 50 and the tension device 10 in particular.

In general, the electric discharge machining apparatus includes a switchgear for a power conductor that advances and retreats the power conductor 5 between a machining position where the wire electrode WE stretched between a pair of wire guides and the power conductor 5 contact each other and a retreat position where the wire electrode WE and the power conductor 5 do not contact each other. The switchgear for a power conductor, which is omitted from illustration, is a mechanism provided in the guide assembly 40. The switchgear for a power conductor is able to actuate a drive device (not shown) including a drive source such as an air cylinder to reciprocate the power conductor 5 together with a holder holding the power conductor 5 a predetermined distance between the predetermined machining position and the predetermined retreat position. At the time of automatic wire threading, a drive device of the holder is actuated to move the power conductor 5 to the retreat position away from the wire electrode WE. After automatic wire threading is completed, the drive device of the holder is actuated to move the power conductor 5 again to the machining position on the travel path of the wire electrode WE, where the power conductor 5 contacts the wire electrode WE. In the disclosure, the switchgear for a power conductor takes a state in which the power conductor 5 is located in the machining position as an OFF state of the power conductor 5, and takes a state in which the power conductor 5 is located in the retreat position as an ON state of the power conductor 5. The switchgear for a power conductor takes a movement of the power conductor 5 toward the machining position as advance, and a movement of the power conductor 5 toward the retreat position as retreat. A reason why the power conductor 5 retreats from the travel path of the wire electrode WE at the time of automatic wire threading is that, if the power conductor 5 is arranged on the travel path of the wire electrode WE, the power conductor 5 may hinder insertion of the wire electrode WE.

The switchgear for the power conductor 5 includes at least the holder holding the power conductor 5 and the drive device that reciprocates the holder (both not shown). The drive source of the drive device of the holder is, for example, a pneumatic or hydraulic fluid cylinder. In the case where a fluid cylinder is used as the drive source, a connection member directly connected to the fluid cylinder can be configured to directly move the holder to move the power conductor 5, and the fluid cylinder can also be combined with a known transfer mechanism such as a link mechanism to move the holder so as to move the power conductor 5. In the embodiment shown in FIG. 1, for example, it is also possible that compressed air is supplied from the compressed air supply device 6 to actuate the air cylinder of the drive source.

A fixing device for a power conductor in a guide assembly is described below in more detail. In an embodiment, the power conductor 5 is, for example, a metal body made of a conductive and highly wear-resistant material such as tungsten carbide (cemented carbide), and is formed in a flat plate shape. The power conductor 5 is inserted into the guide assembly 40 from a horizontal hole opened on a side surface of the guide assembly 40. Mainly by a fixing device 9, the power conductor 5 can be stably fixed with a constant and appropriate fixing force so that the power conductor 5 does not vibrate when receiving an external force and is not damaged by a pressing force of an extrusion member 91. By the fixing device 9, the need for the operator to use a tool to fix a power conductor is eliminated, and the operator is able to replace a used and worn power conductor 5 with a new power conductor 5 relatively easily and in a relatively short time. Or, the operator is able to relatively easily slide the power conductor 5 and change a portion of the power conductor 5 that contacts the wire electrode WE.

The fixing device 9 mainly includes a moving body 91 reciprocating in the horizontal uniaxial direction, and a drive device 9A including a drive source 92 and a transfer mechanism 95. Hereinafter, when different names are used for the moving body 91, the drive source 92 and the transfer mechanism 95, the same reference numerals will be assigned for description. The fixing device 9 is a mechanism in which, by operating the drive device 9A and reciprocating the extrusion member 91 being a moving body provided within the guide assembly 40, a constant force is applied to the power conductor, and the power conductor 5 is pressed against a fixation surface within the guide assembly 40 and brought into a fixed state. In the fixing device 9 of the electric discharge machining apparatus of the disclosure, in more detail, the power conductor 5 is fixed to a fixation surface of the holder holding the power conductor 5, the holder being provided within the guide assembly 40 and functioning as a moving body of the switchgear for a power conductor. In the state in which the power conductor 5 is fixed, the extrusion member 91 pushes out the power conductor 5 in the direction of the wire electrode WE with a constant force. At this time, the pressing force with which the extrusion member 91 pushes out the power conductor 5 in the direction of the wire electrode WE is greater than a holding force with which an elastic member 93 pushes out the power conductor 5 and holds the power conductor 5 between itself and the guide assembly 40. Since the power conductor 5 is fixed with a constant and appropriate pressing force by the pressing force of the extrusion member 91, the power conductor 5 does not vibrate or wobble during machining.

In the fixing device 9, by actuating the drive source 92 to operate the drive device 9A and moving the extrusion member 91 in a direction away from the wire electrode WE, the pressing force applied to the power conductor 5 is removed, and the power conductor 5 is brought into a "temporarily fixed state" being a state in which the extrusion member 91 is not fixed. The fixing device 9 includes the elastic member 93. The elastic member 93 constantly pushes out the power conductor 5 in the direction of the wire electrode WE in a state in which the power conductor 5 is attachable to and detachable from the guide assembly 40. The elastic member 93 expands and contracts in a direction parallel to a direction in which the extrusion member 91 reciprocates. The elastic member 93 is provided so that one end thereof is fixed to a bottom of a hole 90H drilled inside the extrusion member 91 along an axis direction of the extrusion member 91, and the other end thereof is able to protrude from an end face of the hole 90H on an end face of the extrusion member 91 and so that it is constantly in direct or indirect contact with a side surface of the power conductor 5. In particular, in the fixing device 9 shown in FIG. 2 and FIG. 3, the elastic member 93 is provided in the extrusion member 91 and substantially coaxially with the extrusion member 91. The elastic member 93 is specifically, for example, rubber or a compression coil spring. The elastic member 93 pushes out the power conductor 5 in the direction parallel to the direction in which the extrusion member 91 reciprocates and presses the power conductor 5 against the fixation surface within the guide assembly 40, thereby holding the power conductor 5 between itself and the guide assembly 40. At this time, the holding force with which the elastic member 93 holds the power conductor 5 within the guide assembly 40 is smaller than an external force applied by the operator when pushing out the power conductor 5 in a sliding direction. Accordingly, in the fixing device for a power conductor of the electric discharge machining apparatus of the disclosure, when a normal power conductor 5 is in a non-fixed state, the power conductor 5 is in the so-called "temporarily fixed state". Hence, when the power conductor 5 is in the temporarily fixed state, the power conductor 5 is held in the guide assembly by the elastic member 93 and does not fall off or shift position in the sliding direction. When the power conductor 5 is in the temporarily fixed state, the operator is able to replace the power conductor 5 with a new one or slide the power conductor 5 to change the portion of the power conductor 5 that contacts the wire electrode WE.

The drive device 9A of the fixing device 9 moves the extrusion member 91 in the direction of the wire electrode WE to apply a constant pressing force to the power conductor 5. The drive device 9A transmits the power of the drive source 92 to the extrusion member 91 directly, or via, for example, the transfer mechanism 95 such as a link mechanism, to move the extrusion member 91. The drive source 92 of the drive device 9A is specifically, for example, a fluid cylinder driven by compressed air. In the present embodiment, compressed air can be supplied from the compressed air supply device 6 shown in FIG. 1 without addition of a new compressed air supply source such as an air compressor.

The drive source 92 of the drive device 9A in the embodiment is combined with the link mechanism 95 of the drive device 9A. Hence, in the drive device 9A of the embodiment, by the link mechanism 95, there is no need to install the drive source 92 in series with the direction in which the extrusion member 91 reciprocates, and the drive source 92 can be arranged in a relatively free position. According to a leverage ratio of the link mechanism 95, sufficient pressing force can be obtained by a small cylinder with relatively small power. Hence, the drive device 9A in the embodiment enables the entire fixing device 9 to be compact. For example, in the upper guide assembly 40A, by installing the drive source 92 of the drive device 9A on the upper guide assembly 40A, the drive source 92 can be prevented from being immersed in an electric discharge machining fluid supplied to a machining tank.

As the elastic member 93 of the fixing device 9, an object that expands and contracts, such as, for example, a compression spring (compression coil spring), a tension spring (tension coil spring), natural rubber, or silicon rubber, may be applied.

Since the elastic member 93 holds the power conductor 5 on the guide assembly 40 side with a small holding force, the power conductor 5 may be prevented from falling out of the horizontal hole of the guide assembly 40 or from shifting position in the sliding direction. For example, the following situation is prevented: after the power conductor 5 has been slid to change the portion that contacts the wire electrode WE, the power conductor 5 may be displaced when it is fixed, such that a worn portion of the power conductor 5 may unintentionally contact the wire electrode WE again.

By changing the material or shape of the elastic member 93, the force holding the power conductor 5 in the guide assembly 40 can be easily changed. Hence, regardless of the size of the power conductor 5, the guide assembly 40 can be configured so that the power conductor 5 can be attached thereto and detached therefrom in the temporarily fixed state. Meanwhile, it is possible to easily bring about a state in which the power conductor 5 is slidably held in an axial direction of the power conductor at the same time as an external force is applied to the power conductor 5, without the power conductor 5 falling off or shifting position.

First Embodiment

Figure 2:
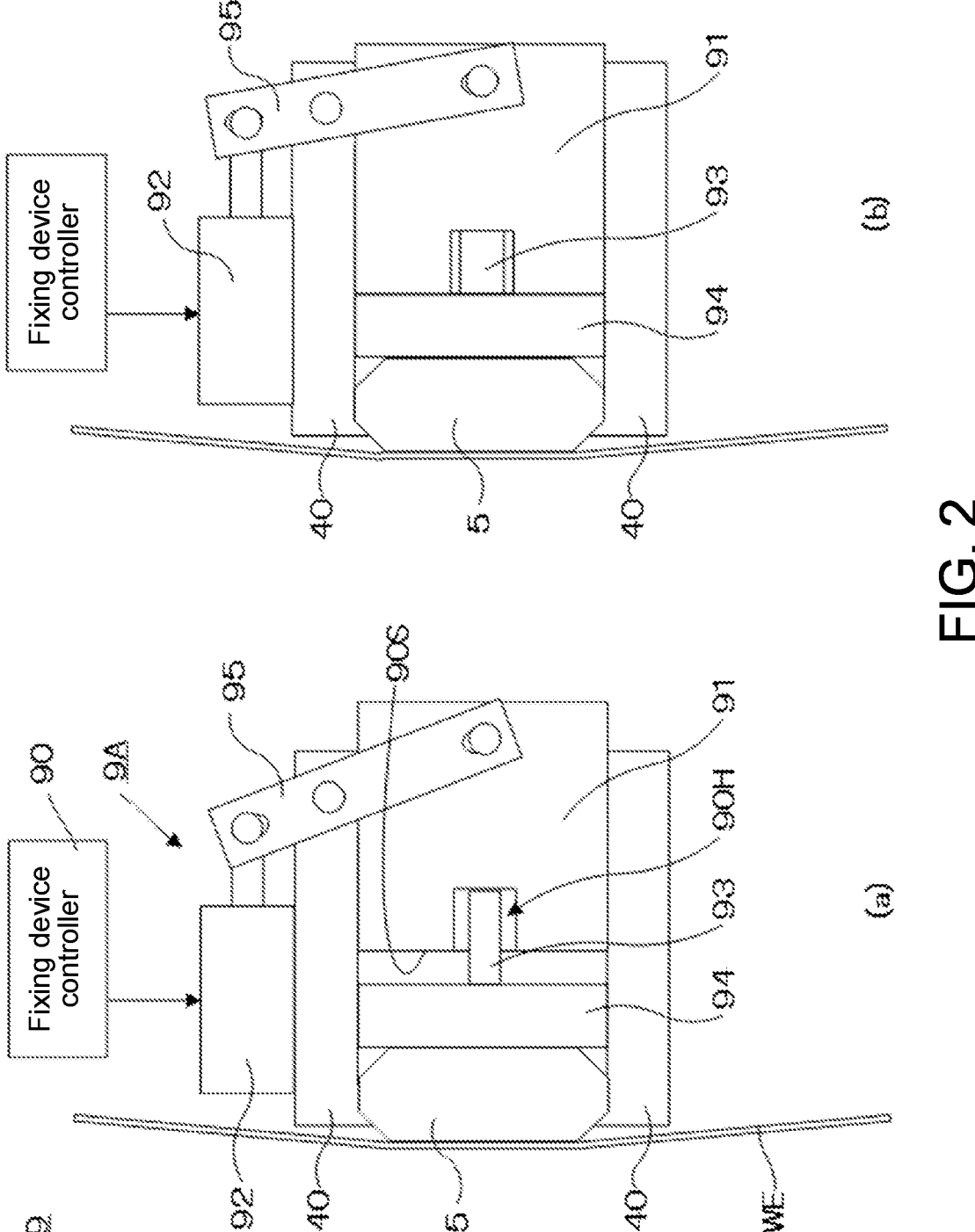
FIG. 2 is a schematic side view showing a fixing device in a first embodiment of the disclosure.

FIG. 2 shows the fixing device 9 of a first embodiment of the electric discharge machining apparatus of the disclosure.
(a) of FIG. 2 schematically shows the temporarily fixed state of the power conductor 5. In the first embodiment, the extrusion member 91 is specifically a pressing cylinder, and the drive source 92 of the drive device 9A is an air cylinder. An operation of the air cylinder 92 causes, via the link mechanism 95, the pressing cylinder 91 to move in a release direction (rightward direction in the figure). When the pressing cylinder 91 moves in the releasing direction, an advance side end face 90S of the pressing cylinder 91 is separated from a pusher 94, so that the pusher 94 holds the power conductor 5 with an elastic force of the elastic member 93. At this time, the power conductor 5 is released from the pressing force of the pressing cylinder 91 and brought into the temporarily fixed state. When the power conductor 5 is in the temporarily fixed state, the elastic member 93 holds the power conductor 5 so that the power conductor 5 is slidable in the axial direction (depth direction in the figure) of the power conductor 5 when an external force is applied to the power conductor 5.
(b) of FIG. 2 schematically shows the fixed state of the power conductor 5. An operation of the air cylinder 92 causes, via the link mechanism 95, the pressing cylinder 91 to move in a pressing direction (leftward direction in the figure). When the pressing cylinder 91 moves in the pressing direction, the elastic member 93 receives a force of the pressing cylinder 91 and is elastically deformed. The advance side end face 90S of the pressing cylinder 91 abuts against the pusher 94 and directly presses the pusher 94. At this time, the power conductor 5 is pressed and fixed by the pusher 94 that is directly pressed by the pressing cylinder 91, and the power conductor 5 is brought into the fixed state.

A fixing device controller 90 controls the fixing device 9. The fixing device controller 90 outputs a command signal to the drive device 9A of the fixing device 9, and causes the drive device 9A to perform a predetermined operation, thereby switching an installation state of the power conductor 5 in the guide assembly 40 between the fixed state and the temporarily fixed state. FIG. 2 does not show an actual installation position of the fixing device controller 90. The fixing device controller 90 is actually arranged in a position away from the guide assembly 40. The wire electric discharge machining of the disclosure can be configured so that the fixing device 9 is controlled by the control device 8 including a numerical control device through the fixing device controller 90. Alternatively, the control device 8 may be configured to include the fixing device controller 90 so as to directly control the fixing device 9.

In the electric discharge machining apparatus of the first embodiment, the drive device 9A of the fixing device 9 for a power conductor can be used as the drive device of the switchgear for a power conductor (not shown). In the case where the switchgear is configured to share the drive device 9A of the fixing device 9, when the drive device 9A of the fixing device 9 is actuated to release the power conductor 5 from the pressing force and bring the power conductor 5 into the temporarily fixed state, the drive device 9A drives the switchgear at the same time to retreat the power conductor 5 from the travel path of the wire electrode WE to the predetermined retreat position. On the other hand, when the drive device 9A of the fixing device 9 is actuated to press the power conductor 5 and bring the power conductor 5 into the fixed state, the drive device 9A drives the switchgear at the same time to move the power conductor 5 to the machining position on the travel path of the wire electrode WE.

In the case where the switchgear is configured to share the drive device 9A of the fixing device 9, by fixing the power conductor 5 and turning on/off the power conductor 5 by one actuator, the size of the guide assembly 40 is reduced and the fixing device 9 is relatively easily installed as compared with a configuration in which the drive device 9A of the fixing device 9 and the drive device of the switchgear are separately provided. Meanwhile, some components of the fixing device 9 and some components of the switchgear can be shared, and the number of parts required to install the fixing device 9 is reduced, thereby facilitating installation of the fixing device 9.

Second Embodiment

Figure 3:
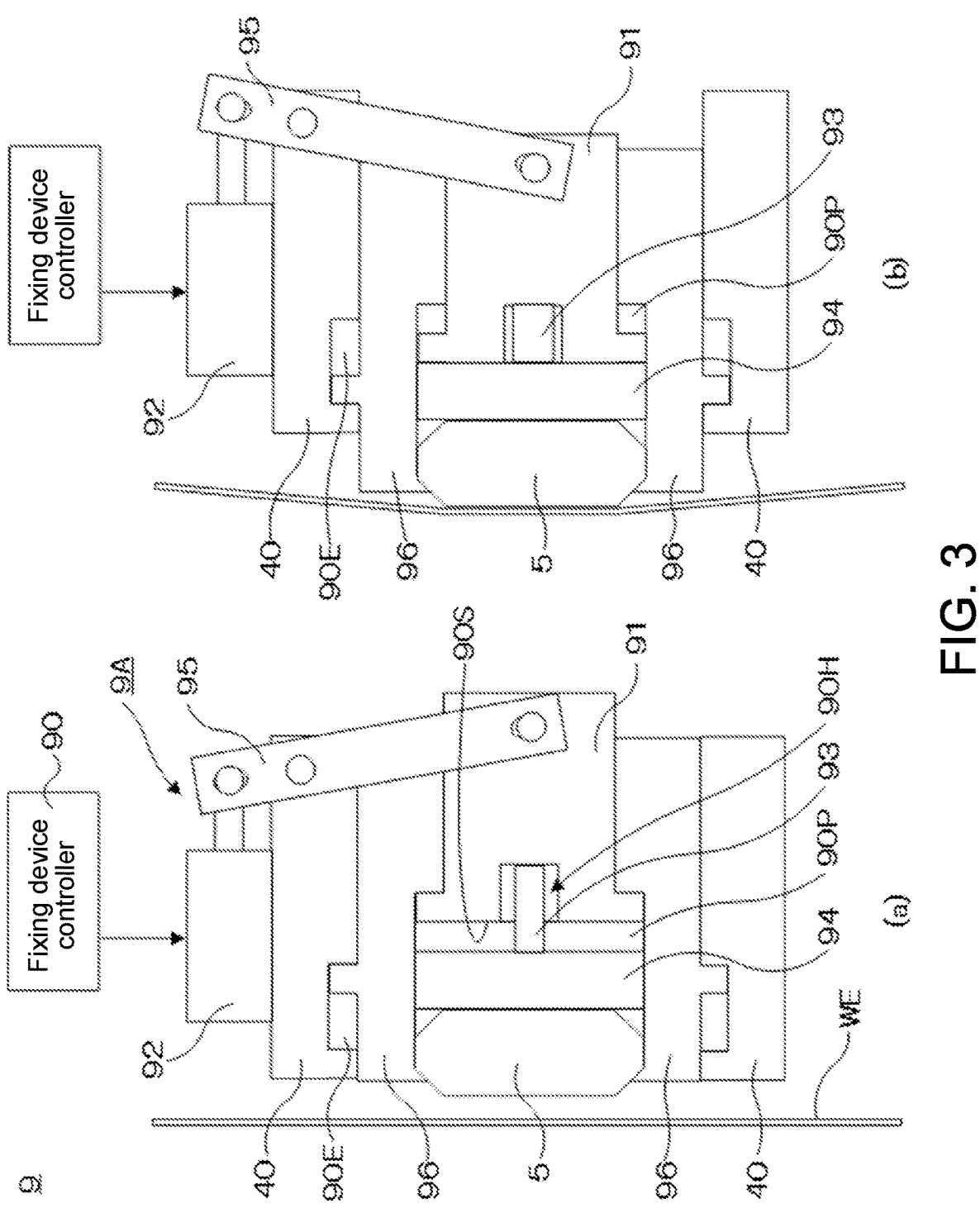
FIG. 3 is a schematic side view showing a fixing device also serving as a retreat mechanism according to a second embodiment of the disclosure.

FIG. 3 shows the fixing device 9 of a second embodiment of the electric discharge machining apparatus of the disclosure. The members or portions assigned the same reference numerals as in FIG. 2 are substantially the same as those shown in FIG. 2 and detailed description thereof may be omitted. In the second embodiment shown in FIG. 3, the fixing device 9 for a power conductor includes the fixing device controller 90, the extrusion member 91, and the drive device 9A including the drive source 92 and the link mechanism 95. A switchgear for a power conductor shares the extrusion member 91 and the drive device 9A including the drive source 92 and the link mechanism 95 with the fixing device 9, and includes a retreat slide 96 being the holder holding the power conductor 5.

(a) of FIG. 3 schematically shows that the power conductor 5 in the temporarily fixed state is moving to the predetermined retreat position. In the second embodiment, the extrusion member 91 is specifically a pressing cylinder, and the drive source 92 of the drive device 9A is specifically an air cylinder. An operation of the air cylinder 92 of the fixing device 9 causes, via the link mechanism 95, the pressing cylinder 91 to move in the releasing direction (rightward direction in the figure) along a pressing groove 90P formed on an inner surface of a hollow portion of the retreat slide 96 of the switchgear for a power conductor. When the pressing cylinder 91 moves in the releasing direction, the advance side end face 90S of the pressing cylinder 91 is separated from the pusher 94, so that the pusher 94 holds the power conductor 5 with the elastic force of the elastic member 93. When the pressing cylinder 91 continues to move, a flange of the pressing cylinder 91 abuts against a retreat side end of the pressing groove 90P and the pressing cylinder 91 stops. Furthermore, by continuing to operate the air cylinder 92, the retreat slide 96 moves along a retreat groove 90E formed within the guide assembly 40 in a retreat direction (rightward direction in the figure) that is the same as the releasing direction of the power conductor 5. When a flange of the retreat slide 96 abuts against a retreat side end of the retreat groove 90E, the retreat slide 96 stops in the predetermined retreat position of the power conductor 5. In the switchgear, when the power conductor 5 is retreated from the machining position on the travel path of the wire electrode WE to the retreat position, in the fixing device 9, the power conductor 5 is released from the state of being pressed and is brought into the temporarily fixed state by the drive device 9A.

(b) of FIG. 3 schematically shows that the power conductor 5 in the fixed state has moved to the machining position. An operation of the air cylinder 92 of the fixing device 9 causes, via the link mechanism 95, the pressing cylinder 91 to move along the pressing groove 90P in a fixing direction (leftward direction in the figure) in which a power conductor is fixed. When the pressing cylinder 91 has advanced to a position where it is unable to move any further in the fixing direction, the elastic member 93 receives a force of the pressing cylinder 91 and is elastically deformed. The advance side end face 90S of the pressing cylinder 91 abuts against the pusher 94 and directly presses the pusher 94. Furthermore, by continuing to operate the air cylinder 92, the retreat slide 96 moves along the retreat groove 90E in a direction (leftward direction in the figure) of the machining position on the travel path of the wire electrode WE where the power conductor 5 and the wire electrode WE contact each other, the direction being parallel to the fixing direction. When the flange of the retreat slide 96 abuts against an advance side end of the retreat groove 90E, the retreat slide 96 stops in the predetermined machining position of the power conductor 5. In the switchgear for a power conductor, when the power conductor 5 is advanced from the predetermined retreat position to the machining position on the travel path of the wire electrode WE, in the fixing device 9, the power conductor 5 is pressed and fixed to an advance side inner surface inside the hollow of the retreat slide 96 by the pressing cylinder 91 via the pusher 94 and is brought into the fixed state.

In the electric discharge machining apparatus of the embodiment already described in detail, when a command to start machining is given to the control device 8, for example, by obtaining information from the fixing device controller 90 or by obtaining a signal of a position detector (not shown) that detects the position of the pressing cylinder 91, information about the fixed state of the power conductor 5 can be acquired. Then, if it is determined that the power conductor 5 is not in the fixed state by the fixing device 9, the control device 8 or the fixing device controller 90 may issue a warning to notify the operator of the abnormality and stop machining. According to this configuration, trouble caused by performing machining while forgetting to fix the power conductor 5 can be prevented.

The electric discharge machining apparatus of the embodiment can be configured as follows. If it is determined that the power conductor 5 is not in the fixed state by the fixing device 9 when the command to start machining is given to the control device 8, the fixing device 9 may be activated by the control device 8 or the fixing device controller 90 so as to automatically enter the fixed state. According to this configuration, by starting machining after switching the power conductor 5 to the fixed state, the trouble caused by performing machining while forgetting to fix the power conductor 5 can be prevented.

The electric discharge machining apparatus of the embodiment can be implemented in combination with a sliding device for a power conductor that slides the power conductor 5 by a predetermined amount in the horizontal uniaxial direction orthogonal to the wire electrode WE on which the power conductor 5 is stretched in a vertical direction.

The sliding device includes a drive device that is able to move the power conductor 5 by the predetermined amount in the horizontal uniaxial direction orthogonal to the wire electrode WE. For example, a detector that electrically measures a contact pressure between the power conductor 5 and the wire electrode WE is provided. When the control device 8 determines that the contact pressure detected by the detector has dropped below a predetermined reference pressure, the control device 8 operates the fixing device 9 for a power conductor and the switchgear for a power conductor (not shown). When the power conductor 5 is not fixed in a predetermined position within the guide assembly 40 by the fixing device 9, the power conductor 5 is pushed out by the elastic member 93 in the direction of the wire electrode WE and brought into a state of being attachable to and detachable from the guide assembly 40. The sliding device can be operated to slide the power conductor 5 by the predetermined amount that is set in advance, so as to automatically change a contact position in the power conductor 5 with the wire electrode WE. In this way, by combining the sliding device for a power conductor with the fixing device for a power conductor of the electric discharge machining apparatus of the embodiment, unattended operation is possible even during long-time machining that requires renewing the contact position in the power conductor 5 during machining.

Although the embodiments of the disclosure have been described above, as shown by several modifications, the disclosure is not limited to the above-described embodiments, and various design changes are possible within the scope of the claims. For example, the drive source of the drive device in the fixing device for a power conductor of the embodiment is not limited to the specifically shown air cylinder, and a linear motor, a rotary motor, or an electromagnetic motor, for example, may serve as the drive source.

What is claimed is:

1. An electric discharge machining apparatus, comprising:
a wire guide, positioning and guiding a wire electrode stretched perpendicularly to a horizontal line;
a power conductor, energizing the wire electrode;

a guide assembly, accommodating the wire guide and the power conductor;
an extrusion member, provided in the guide assembly and pushing out the power conductor in a direction of the wire electrode;
a drive device, reciprocating the extrusion member in a horizontal uniaxial direction;
a fixing device, fixing the power conductor in a predetermined position within the guide assembly by the extrusion member; and
an elastic member, provided coaxially with the extrusion member and constantly pushing out the power conductor in the direction of the wire electrode in a state in which the power conductor is attachable to and detachable from the guide assembly,
wherein,
in a state in which the elastic member constantly pushes out the power conductor in the direction of the wire electrode and the power conductor is attachable to and detachable from the guide assembly,
the power conductor is attachable and detachable in a power conductor axial direction,
the electric discharge machining apparatus comprises, in the guide assembly, a switchgear that advances or retreats the power conductor between a machining position where the power conductor contacts the wire electrode and a retreat position where the power conductor does not contact the wire electrode;
a drive device in the fixing device serves as a drive device driving a retreat slide that advances and retreats the power conductor;
in response to the power conductor being located in the machining position, the power conductor is fixed in the predetermined position within the guide assembly by the extrusion member; and
in response to the power conductor being located in the retreat position, the power conductor is constantly pushed out in the direction of the wire electrode by the elastic member while not being fixed in the predetermined position by the extrusion member.

2. The electric discharge machining apparatus according to claim 1, wherein
the electric discharge machining apparatus is configured to issue a warning and stop machining in response to the power conductor being not fixed in the predetermined position by the fixing device at the start of machining.

3. The electric discharge machining apparatus according to claim 1, wherein,
in response to the power conductor being not fixed in the predetermined position by the fixing device at the start of machining, the electric discharge machining apparatus actuates the fixing device to automatically switch to a state of fixing the power conductor in the predetermined position and starts machining.

4. The electric discharge machining apparatus according to claim 1, wherein
the drive device is a fluid cylinder.

5. An electric discharge machining apparatus, comprising:
a wire guide, positioning and guiding a wire electrode stretched perpendicularly to a horizontal line;
a power conductor, energizing the wire electrode;
a guide assembly, accommodating the wire guide and the power conductor;
an extrusion member, provided in the guide assembly and pushing out the power conductor in a direction of the wire electrode;

a drive device, reciprocating the extrusion member in a horizontal uniaxial direction;

a fixing device, fixing the power conductor in a predetermined position within the guide assembly by the extrusion member; and an elastic member, provided coaxially with the extrusion member and constantly pushing out the power conductor in the direction of the wire electrode in a state in which the power conductor is attachable to and detachable from the guide assembly, wherein, in a state in which the elastic member constantly pushes out the power conductor in the direction of the wire electrode and the power conductor is attachable to and detachable from the guide assembly, the power conductor is attachable and detachable in a power conductor axial direction, and the electric discharge machining apparatus comprises, in the guide assembly, a sliding device that slides the power conductor by a predetermined amount in a horizontal uniaxial direction orthogonal to the wire electrode on which the power conductor is stretched in a vertical direction;

the electric discharge machining apparatus comprises a control device that, in a state in which the power conductor is not fixed in the predetermined position within the guide assembly by the fixing device, and the power conductor is pushed out by the elastic member in the direction of the wire electrode and is attachable to and detachable from the guide assembly, controls the sliding device to operate so as to slide the power conductor by the predetermined amount that is set in advance and automatically change a contact position in the power conductor with the wire electrode.

6. A method for fixing a power conductor in an electric discharge machining apparatus, the electric discharge machining apparatus comprising a guide assembly that accommodates a wire guide and a power conductor, an extrusion member that is provided in the guide assembly and pushes out the power conductor in a direction of a wire electrode stretched perpendicularly to a horizontal line, a drive device that reciprocates the extrusion member in a horizontal uniaxial direction, and an elastic member that is provided coaxially with the extrusion member and constantly pushes out the power conductor in the direction of the wire electrode in a state in which the power conductor is attachable to and detachable from the guide assembly, the method comprising:

when fixing the power conductor in a predetermined position within the guide assembly, operating the drive device so as to push out the power conductor in the direction of the wire electrode with a force greater than a force of the elastic member pushing out the power conductor, and to fix the power conductor with a force preventing the power conductor from vibrating when receiving an external force and preventing the power conductor from being damaged by a pressing force of the extrusion member; and when not fixing the power conductor within the guide assembly, operating the drive device so as to release the power conductor from being fixed by the elastic member while the power conductor does not shift position within the guide assembly, sliding the power conductor by a predetermined amount in a horizontal uniaxial direction orthogonal to an axis direction of the wire electrode, and changing a position on a contact surface of the power conductor where the power conductor contacts the wire electrode, or attaching and detaching the power conductor to and from the guide assembly.

* * * * *